(12) United States Patent
Kwon et al.

(10) Patent No.: US 8,767,649 B2
(45) Date of Patent: Jul. 1, 2014

(54) METHOD FOR RECEIVING CONTROL INFORMATION IN A WIRELESS COMMUNICATION SYSTEM, AND APPARATUS FOR SAME

(75) Inventors: Yeong Hyeon Kwon, Anyang-si (KR); So Yeon Kim, Anyang-si (KR); Han Gyu Cho, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 13/266,443

(22) PCT Filed: Apr. 26, 2010

(86) PCT No.: PCT/KR2010/002594
§ 371 (c)(1),
(2), (4) Date: Oct. 26, 2011

(87) PCT Pub. No.: WO2010/126259
PCT Pub. Date: Nov. 4, 2010

(65) Prior Publication Data
US 2012/0044899 A1    Feb. 23, 2012

Related U.S. Application Data

(60) Provisional application No. 61/172,780, filed on Apr. 26, 2009.

(30) Foreign Application Priority Data

Apr. 22, 2010    (KR) .................. 10-2010-0037302

(51) Int. Cl.
*H04W 72/02*    (2009.01)

(52) U.S. Cl.
USPC ......................................... 370/329; 455/452.1

(58) Field of Classification Search
CPC ....................................................... H04W 72/02
See application file for complete search history.

(56) References Cited

U.S. PATENT DOCUMENTS 8,031,583 B2 * 10/2011 Classon et al. ................ 370/208
2008/0225786 A1 * 9/2008 Han et al. ...................... 370/329

FOREIGN PATENT DOCUMENTS

KR    1020090033126    4/2009
WO    2008/156348    12/2008

* cited by examiner

*Primary Examiner* — Jianye Wu
(74) *Attorney, Agent, or Firm* — Lee, Hong, Degerman, Kang & Waimey

(57) ABSTRACT

The present invention discloses a method in which user equipment receives control information in a wireless communication system adopting carrier aggregation. In detail, the method comprises the steps of receiving a control region via one or more component carriers from among a plurality of component carriers transmitted by a base station, and performing a blind decoding process on the control region to obtain control information allocated to the user equipment, wherein the control region includes control information for said one or more component carriers or control information for the rest of the component carriers.

10 Claims, 13 Drawing Sheets

(a) control-plane protocol stack (b) user-plane protocol stack (a) 1TX or 2TX (b) 4 TX

METHOD FOR RECEIVING CONTROL INFORMATION IN A WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2010/002594, filed on Apr. 26, 2010, which claims the benefit of earlier filing date and right of priority to Korean Application Serial No. 10-2010-0037302, filed on Apr. 22, 2010, and also claims the benefit of U.S. Provisional Application Ser. No. 61/172,780, filed on Apr. 26, 2009, the contents of which are all hereby incorporated by reference herein in their entirety.

TECHNICAL FIELD

The present invention relates to a wireless communication system, and more particularly, to a method for receiving control information in a user equipment of a wireless communication system to which a carrier aggregation scheme is applied and an apparatus for the same.

BACKGROUND ART

A $3^{rd}$ generation partnership project long term evolution (3GPP LTE), LTE-Advanced (hereinafter, referred to as 'LTE-A') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat and request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of component carriers. For wider frequency bandwidth, the carrier aggregation aims to use a plurality of component carriers as one great logical frequency band. A bandwidth of each component carrier can be defined based on a bandwidth of a system block used in the LTE system. Each component carrier is transmitted using a component carrier. In this specification, the component carrier may mean a component carrier for carrier aggregation or a center carrier of the component carrier depending on the context. The component carrier for carrier aggregation and the center carrier of the component carrier may be used together.

DISCLOSURE

Technical Problem

An object of the present invention devised to solve the conventional problem is to provide a method for receiving control information in a user equipment of a wireless communication system to which a carrier aggregation scheme is applied and an apparatus for the same.

It will be appreciated by persons skilled in the art that the objects that could be achieved with the present invention are not limited to what have been particularly described hereinabove and the above and other objects that the present invention could achieve will be more clearly understood from the following detailed description.

Technical Solution

In an aspect of the present invention, a method for receiving control information by a user equipment in a wireless communication system to which a carrier aggregation scheme is applied comprises the steps of receiving a control region from a base station through one or more of a plurality of component carriers; and performing blind decoding for the control region to acquire the control information allocated to the user equipment, wherein the control region includes control information on the one or more component carriers or control information on the other component carriers. Preferably, the method further comprises the step of receiving information on the one or more component carriers from the base station before receiving the control region.

Also, the step of receiving control information includes performing blind decoding for the same search space corresponding to each of the one or more component carriers, and the control information is subjected to channel coding of one codeword basis.

Moreover, the one or more component carriers are divided into component carriers for downlink control information and component carriers for uplink control information.

In another aspect of the present invention, a user equipment in a wireless communication system to which a carrier aggregation scheme is applied comprises a receiving module receiving a control region from a base station through one or more of a plurality of component carriers; and a processor performing blind decoding for the control region to acquire the control information allocated to the user equipment, wherein the control region includes control information on the one or more component carriers or control information on the other component carriers. Preferably, the receiving module receives information on the one or more component carriers from the base station.

Also, the processor performs blind decoding for the same search space corresponding to each of the one or more component carriers, and the control information is subjected to channel coding of one codeword basis.

Moreover, the one or more component carriers are divided into component carriers for downlink control information and component carriers for uplink control information.

Advantageous Effects

According to the embodiments of the present invention, in a wireless communication system to which a carrier aggregation scheme is applied, a user equipment can effectively receive control information on component carriers from a base station.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single component carrier will be referred to as a legacy system or a narrowband system. By contrast, a system that includes a system band of a plurality of component carriers and uses at least one or more component carriers as a system block of a legacy system will be referred to as an evolved system or a wideband system. The component carrier used as a legacy system block has the same size as that of the system block of the legacy system. On the other hand, there is no limitation in sizes of the other component carriers. However, for system simplification, the sizes of the other component carriers may be determined based on the size of the system block of the legacy system. For example, the 3GPP LTE (Release-8) system and the 3GPP LTE-A (Release-9) system are evolved from the legacy system.

Based on the aforementioned definition, the 3GPP LTE (Release-8) system will herein be referred to as an LTE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system in this specification, the LTE system and the LTE-A system are only exemplary, and the embodiment of the present invention can be applied to all communication systems corresponding to the aforementioned definition. Also, although the embodiment of the present invention will be described based on an FDD mode in this specification, the FDD mode is only exemplary, and the embodiment of the present invention can easily be applied to an H-FDD mode or a TDD mode.

Figure 1:
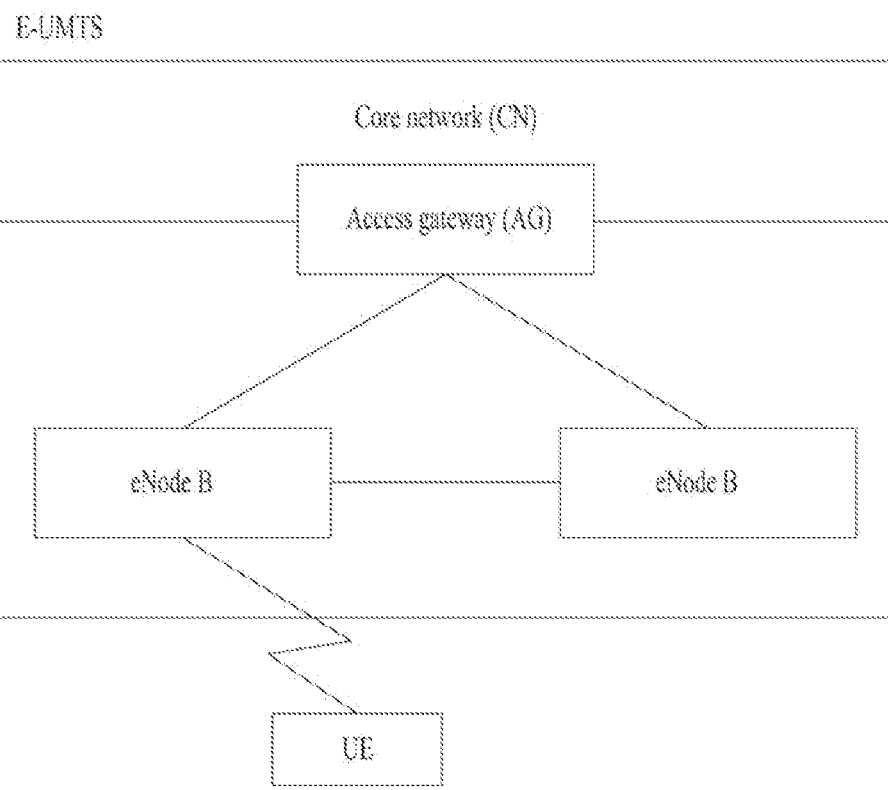
FIG. 1 is a diagram illustrating a network structure of an Evolved Universal Mobile Telecommunications System (E-UMTS), which is an example of a mobile communication system.
Figure 2:
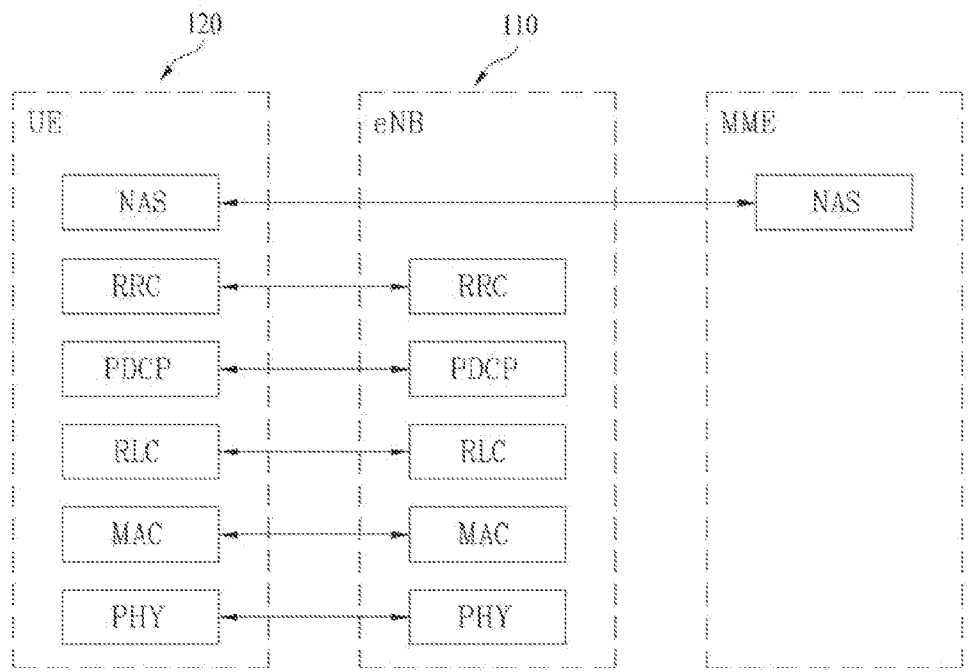
FIG. 2 is a diagram illustrating structures of a control plane and a user plane of a radio interface protocol between a user equipment and E-UTRAN based on the 3GPP radio access network standard.
Figure 2:
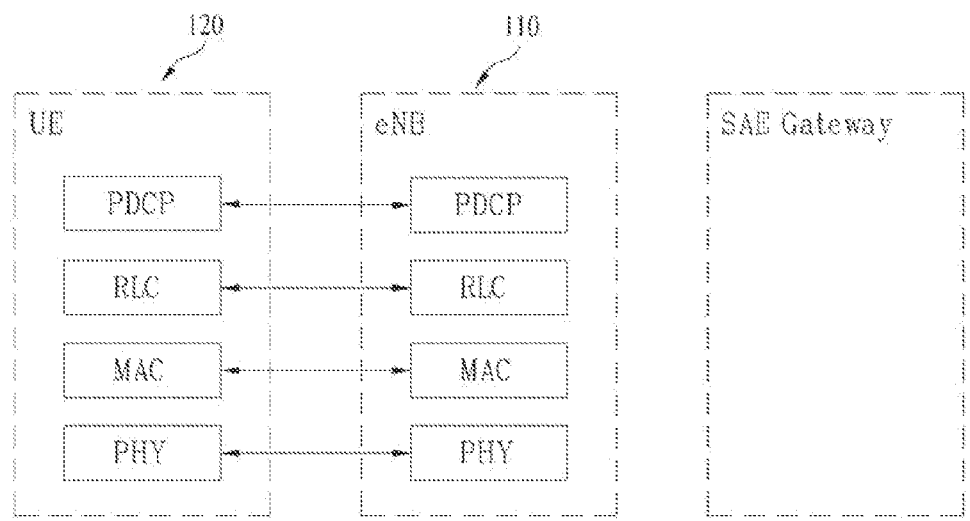

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via a logical channel. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB is established at one of bandwidths of 1.25, 2.5, 5, 10, 15, and 20 MHz and provides a downlink or uplink transmission service to several user equipments. At this time, different cells may be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
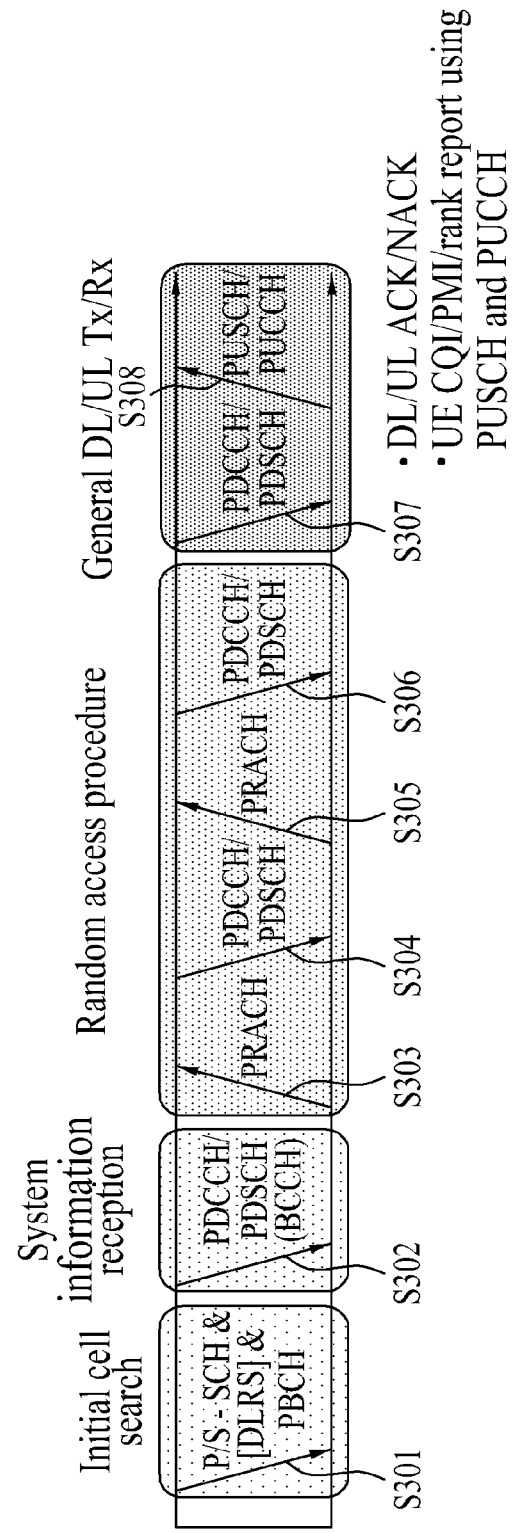
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) in the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the mean time, if the user equipment initially accesses the base station, or if there is no radio resource for signal transmission, the user equipment performs a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. Control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
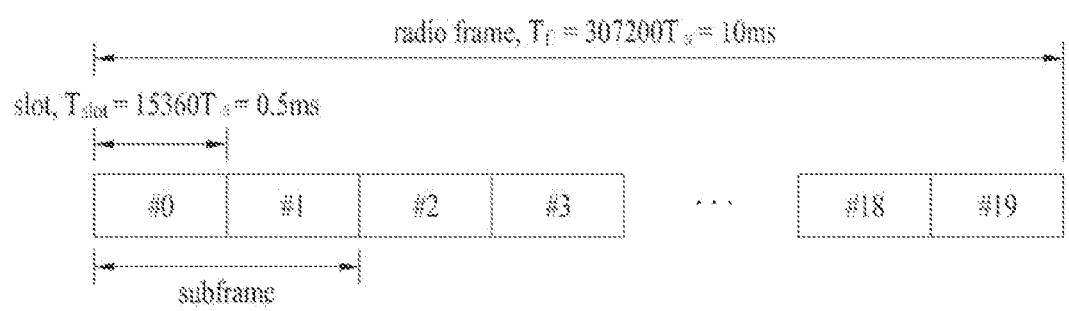
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \cdot T_s$) and includes ten (10) subframes of an equal size. Each sub frame has a length of 1 ms and includes two slots. Each slot has a length of 0.5 ms ($15360 \cdot T_s$). In this case, $T_s$ represents a sampling time, and is expressed by $T_s=1/(15 \text{ kHz} \times 2048)=3.2552 \times 10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
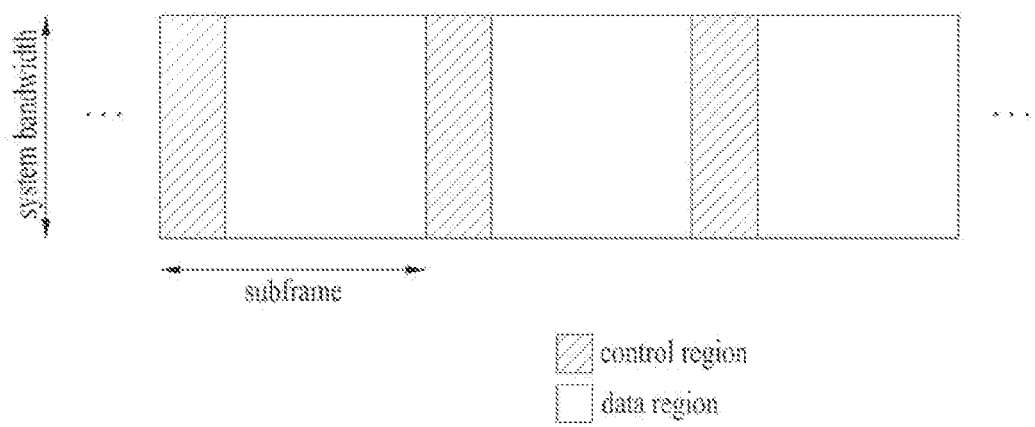
FIG. 5 is a diagram illustrating a functional structure of a downlink radio frame.

FIG. 5 is a diagram illustrating a functional structure of a downlink radio frame.

Referring to FIG. 5, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control channel and a data region for transmission of downlink data. The control region starts from the first OFDM symbol of the subframes and includes one or more OFDM symbols. The control region may have a size set independently per subframe. The control region is used to transmit L1/L2 (layer 1/layer 2) control signals. The data region is used to transmit downlink traffic.

Figure 6:
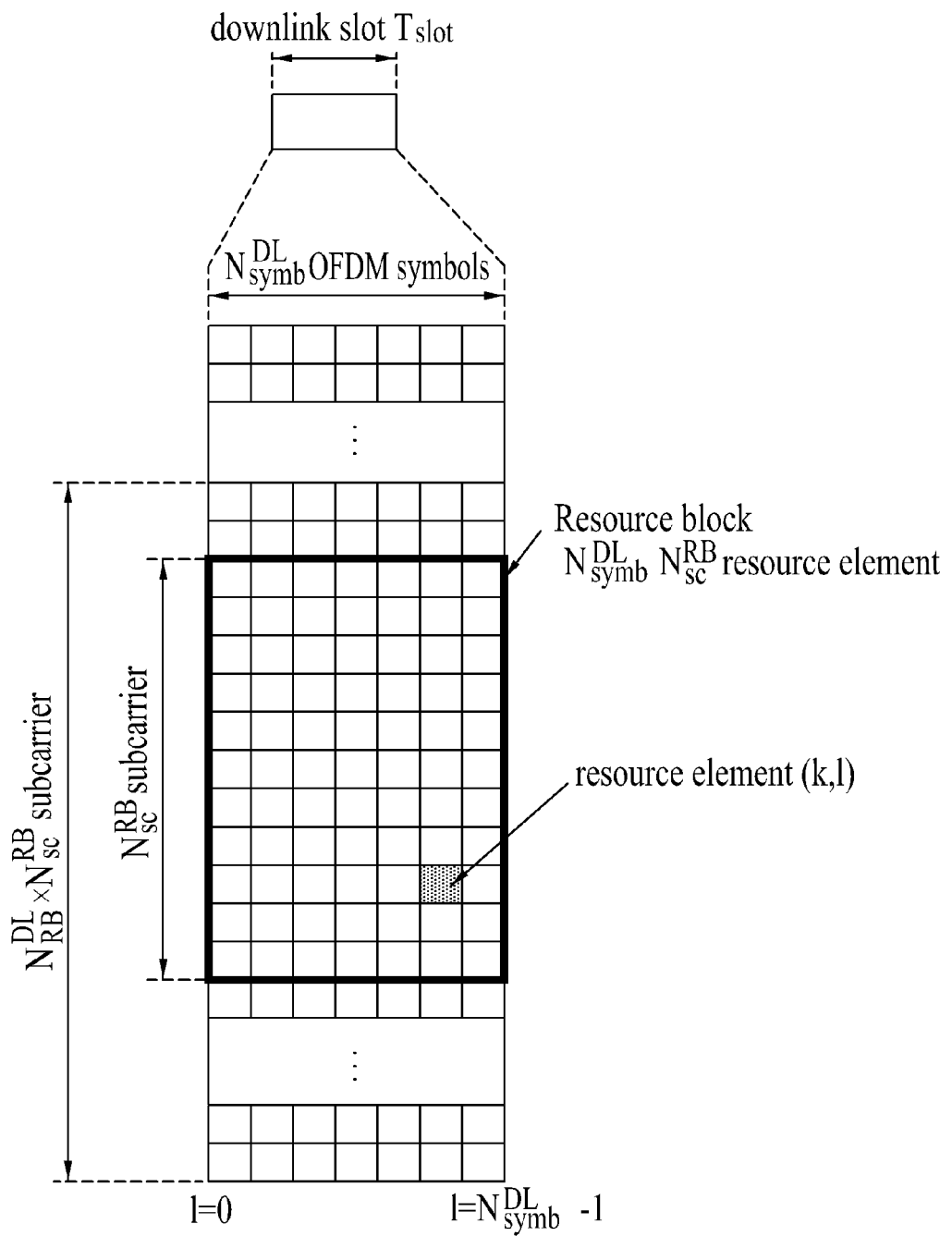
FIG. 6 is a diagram illustrating a resource grid of a downlink slot.

FIG. 6 is a diagram illustrating a resource grid of a downlink slot.

Referring to FIG. 6, the downlink slot includes $N_{symb}^{DL}$ number of OFDM symbols in a time region and $N_{RB}^{DL}$ number of resource blocks in a frequency region. Since each resource block includes $N_{se}^{RB}$ number of subcarriers, the downlink slot includes $N_{RB}^{DL} \times N_{se}^{RB}$ number of subcarriers in the frequency region. Although an example of FIG. 6 illustrates that the downlink slot includes seven OFDM symbols and the resource block includes twelve subcarriers, the present invention is not limited to the example of FIG. 6. For example, the number of OFDM symbols included in the downlink slot may be varied depending on a length of cyclic prefix (CP).

Each element on the resource grid will be referred to as a resource element (RE). One resource element is indicated by one OFDM symbol index and one subcarrier index. One resource block (RB) includes $N_{symb}^{DL} \times N_{se}^{RB}$ number of resource elements. The number $N_{RB}^{DL}$ of resource blocks included in the downlink is subjected to a downlink transmission bandwidth established in a cell.

Figure 7:
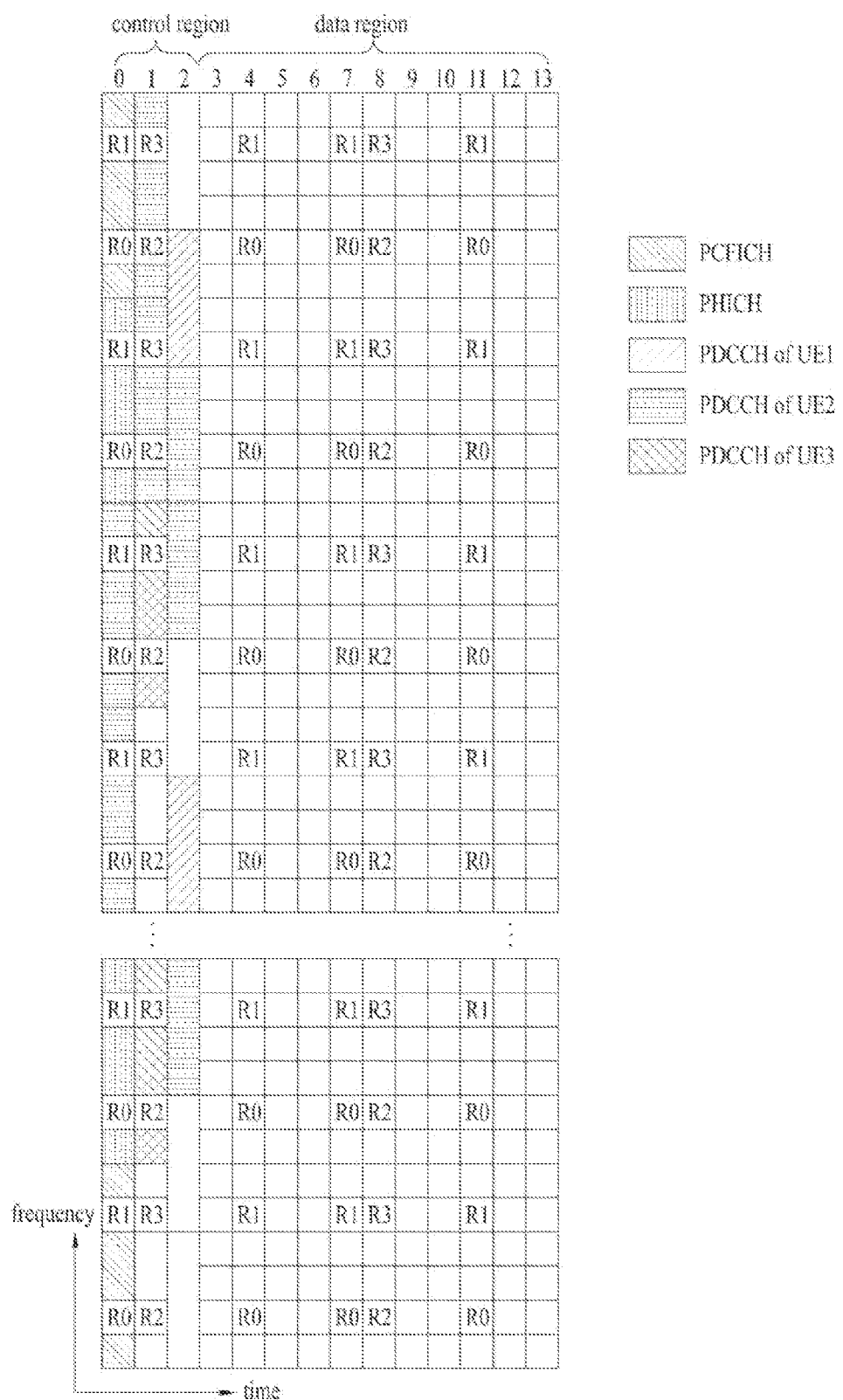
FIG. 7 is a diagram illustrating a control channel included in a control region of a subframe.

FIG. 7 is a diagram illustrating a control channel included in a control region of a subframe.

Referring to FIG. 7, the subframe includes fourteen (14) OFDM symbols. First one to three OFDM symbols are used as the control region in accordance with establishment of subframe, and the other thirteen to eleven OFDM symbols are used as the data region.

In FIG. 7, R1 to R4 represent reference signals (RS) of antennas 0 to 3. The RS is fixed by a given pattern within the subframe regardless of the control region and the data region. The control channel is allocated to a resource to which the RS is not allocated in the control region, and the traffic channel is also allocated to a resource to which the RS is not allocated in the data region. Examples of the control channel allocated to the control region include PCFICH (Physical Control Format Indicator CHannel), PHICH (Physical Hybrid-ARQ Indicator CHannel), and PDCCH (Physical Downlink Control CHannel).

Figure 8:
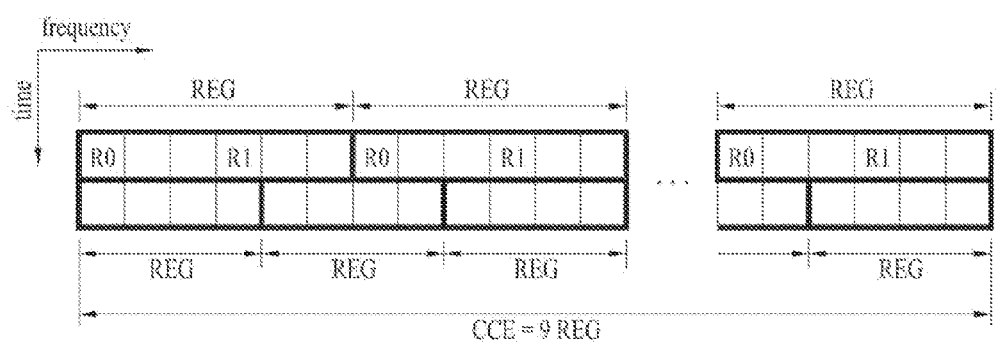
FIG. 8 is a diagram illustrating a resource unit used to constitute a control channel.
Figure 8:
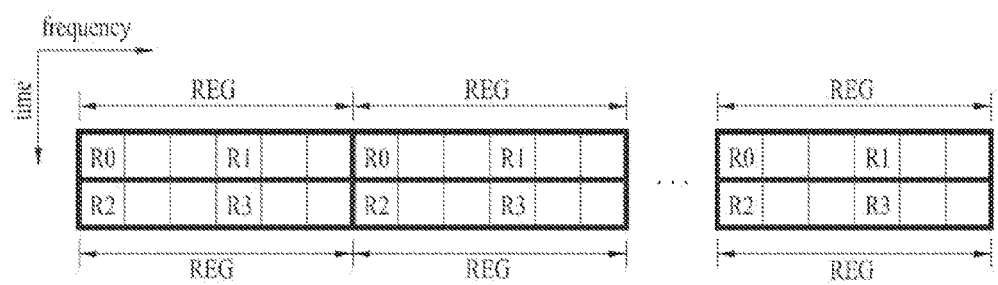

The PCFICH notifies the user equipment of the number of OFDM symbols used in the PDCCH per subframe. The PCFICH is located in the first OFDM symbol and established prior to the PHICH and the PDCCH. The PCFICH includes four resource element groups (REG), each of which is distributed in the control region based on cell ID. One REG includes four REs. The structure of the REG will be described in detail with reference to FIG. 8. The PCFICH value indicates values of 1 to 3, and is modulated by Quadrature Phase Shift Keying (QPSK).

The PHICH is used to transmit HARQ ACK/NACK signals for uplink transmission. The PHICH includes three REGs, and is cell-specifically scrambled. The ACK/NACK signals are indicated by 1 bit, and are spread by a spreading factor (SF)=2 or 4, wherein spreading is repeated three times. A plurality of PHICHs may be mapped with the same resource. The PHICH is modulated by Binary Phase Shift Keying (BPSK).

The PDCCH is allocated to first n number of OFDM symbols of the subframe, wherein n is an integer greater than 1 and is indicated by the PCIFCH. The PDCCH includes one or more CCEs, which will be described in detail later. The PDCCH notifies each user equipment or user equipment group of information related to resource allocation of transport channels, i.e., a paging channel (PCH) and a downlink-shared channel (DL-SCH), uplink scheduling grant, HARQ information, etc.

The PCH and the DL-SCH are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted through the PDCCH. For example, it is assumed that a specific PDCCH is CRC masked with radio network temporary identity (RNTI) called "A," and information on data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH using their RNTI information, and if there are one or more user equipments having RNTI "A", the user equipments receive the PDCCH and receive the PDSCH indicated by "B" and "C" through information of the received PDCCH.

FIG. 8(a) and FIG. 8(b) illustrate resource units used to configure a control channel. In particular, FIG. 8(a) illustrates that the number of transmitting antennas belonging to the base station is 1 or 2, and FIG. 8(b) illustrates that the number of transmitting antennas belonging to the base station is 4. In FIG. 8(a) and FIG. 8(b), different reference signal patterns are illustrated depending on the number of transmitting antennas but a method of establishing a resource unit related to a control channel is illustrated equally.

Referring to FIG. 8(a) and FIG. 8(b), a basic resource unit of the control channel is REG. The REG includes four neighboring resource elements excluding the reference signals. The REG is illustrated with a solid line. The PCFIC and the PHICH include four REGs and three REGs, respectively. The PDCCH is configured in a unit of CCE (control channel element), one CCE including nine REGs.

The user equipment is established to identify $M(L)(\geq L)$ number of CCEs arranged continuously or arranged by a specific rule, whereby the user equipment may identify whether the PDCCH of L number of CCEs is transmitted thereto. A plurality of L values may be considered by the user equipment to receive the PDCCH. CCE sets to be identified by the user equipment to receive the PDCCH will be referred to as a search space. For example, the LTE system defines the search space as expressed in Table 1.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L represents the number of CCEs constituting the PDCCH, $S_k^{(L)}$ represents a search space of the CCE aggregation level L, and $M^{(L)}$ represents the number of PDCCH candidates to be monitored in the search space.

The search space may be divided into a UE-specific search space that allows access to only a specific user equipment and a common search space that allows access to all user equipments within a cell. The user equipment monitors a common search space of the CCE aggregation levels of L=4 and L=8, and monitors a UE-specific search space of the CCE aggregation levels of L=1, L=2, L=4 and L=8. The common search space and the UE-specific search space may be overlapped with each other.

Furthermore, in the PDCCH search space given to a random user equipment for each CCE aggregation level value, the location of the first CCE (i.e., CCE having the smallest index) is varied per subframe depending on the user equipment. This will be referred to as a PDCCH search space hashing.

Figure 9:
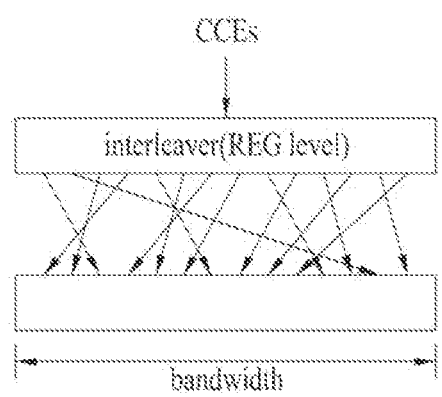
FIG. 9 is a diagram illustrating CCE distribution in a system band.

FIG. 9 is a diagram illustrating an example of a control channel element (CCE) distributed into a system band. Referring to FIG. 9, a plurality of logically continuous CCEs are input to an interleaver. The interleaver performs interleaving of the plurality of CCEs in a unit of REG. Accordingly, the frequency/time resources constituting one CCE are physically distributed into all frequency/time regions within the control region of the subframe. As a result, although the control channel is configured in a unit of CCE, since interleaving is performed in a unit of REG, frequency diversity and interference randomization gain can be maximized.

Figure 10:
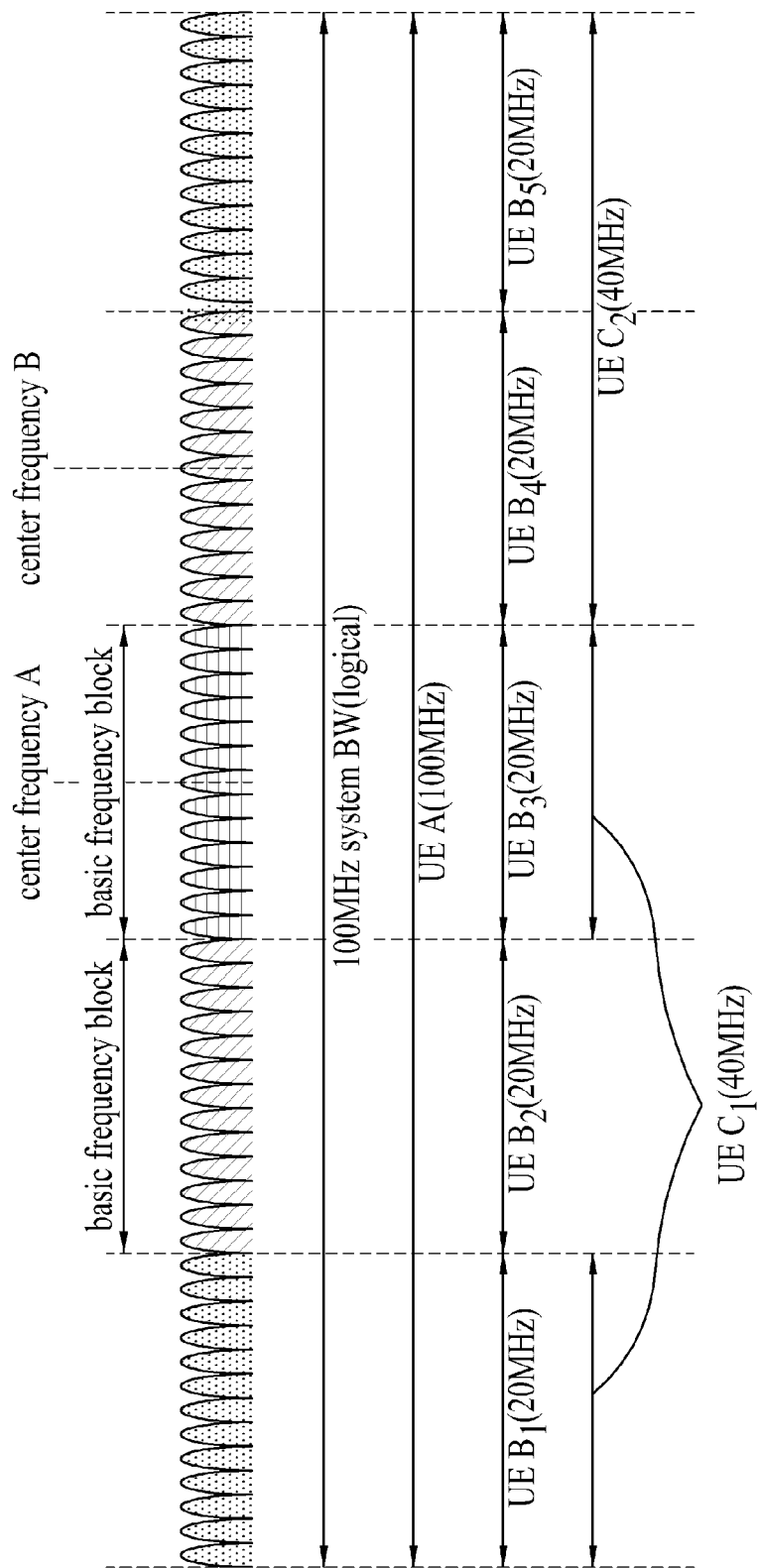
FIG. 10 is a conceptional diagram illustrating carrier aggregation.

FIG. 10 is a conceptional diagram illustrating carrier aggregation. The carrier aggregation means that a plurality of component carriers are used as a huge logical frequency band so that the wireless communication system uses a wider frequency band.

Referring to FIG. 10, all system bandwidths (BW) are logical bandwidths and have a maximum bandwidth of 100 MHz. The system bandwidths include five component carriers, each of which has a maximum bandwidth of 20 MHz. The basic component carrier includes one or more physically continuous subcarriers. Although the respective component carriers have the same bandwidth in FIG. 10, this is only exemplary and the component carriers may have different bandwidths. Also, although it is illustrated that the respective component carriers adjoin each other in the frequency region, this illustration is logically exemplary and the respective component carriers may physically adjoin each other or may be spaced apart from each other.

Center carriers may be used differently for the respective component carriers, or one common center carrier may be used for physically adjoined component carriers. For example, if it is assumed that all component carriers physically adjoin one another in FIG. 10, center carrier A may be used. Also, if it is assumed that the respective component carriers do not adjoin physically one another in FIG. 10, center carrier A and center carrier B may be used separately for the component carriers.

In this specification, the component carrier may correspond to the system band of the legacy system. As the component carrier is defined based on the legacy system, it is possible to facilitate backward compatibility and system design in a radio communication environment where an evolved user equipment and a legacy user equipment coexist. For example, if the LTE-A system supports carrier aggregation, the respective component carrier may correspond to the system band of the LTE system. In this case, the bandwidth of each component carrier may have any one of 1.25, 2.5, 5, 10, and 20 MHz.

If the whole system bandwidth is extended to carrier aggregation, the frequency bandwidth used for communication of user equipments is defined in a unit of component carrier. User equipment A may use 100 MHz which corresponds to the whole system bandwidth, and performs communication using all of five component carriers. User equipments $B_1$ to $B_5$ may use only a bandwidth of 20 MHz and perform communication using one component carrier. User equipments $C_1$ and $C_2$ may use a bandwidth of 40 MHz and perform communication using two component carriers. The two component carriers may or may not logically/physically adjoin each other. The user equipment $C_1$ represents that two component carriers which do not adjoin each other are used, the user equipment $C_2$ represents that two component carriers which adjoin each other are used.

In the mean time, in the current LTE system, the user equipment should perform blind decoding of maximum 44 times to detect the PDCCH transmitted from the base station to the user equipment and acquire downlink control information (DCI) included in the PDCCH. However, in the LTE-A system to which carrier aggregation is applied, since data transmission and reception is performed through a plurality of component carriers, the base station should transmit DCI, i.e., scheduling information on a plurality of uplink component carriers and a plurality of downlink component carriers, and the user equipment should acquire the PDCCH allocated thereto through blind decoding, wherein the PDCCH exists in a control region of the plurality of component carriers.

Figure 11:
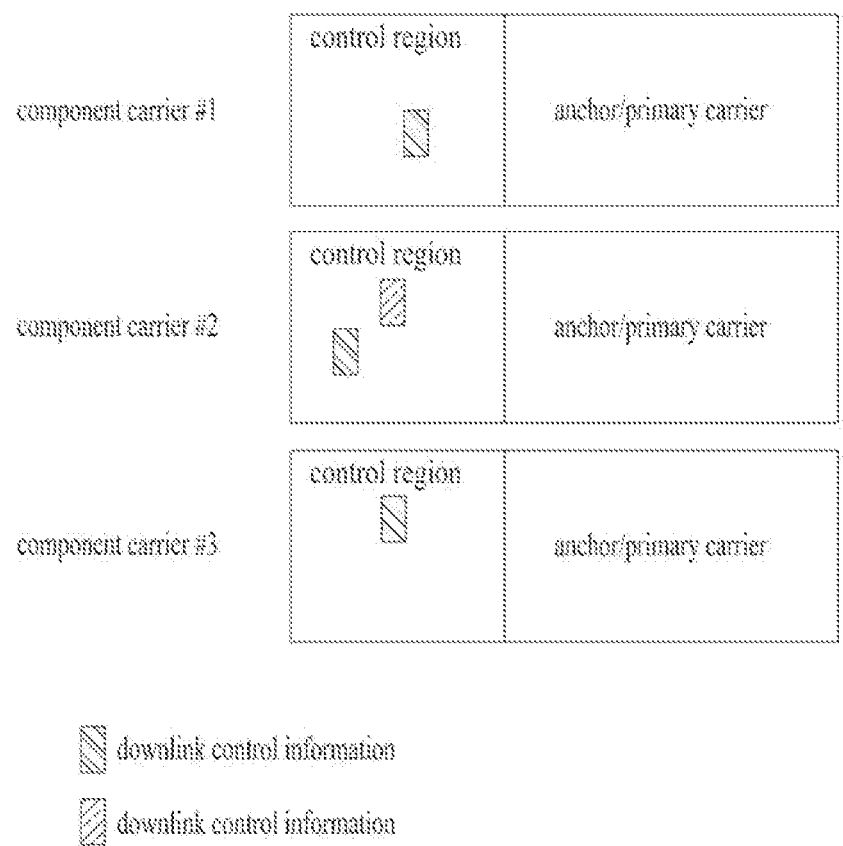
FIG. 11 is a diagram illustrating an example of transmission of control information through a plurality of component carriers in an LTE-A system.

FIG. 11 is a diagram illustrating an example of transmission of control information through a plurality of component carriers in an LTE-A system.

Referring to FIG. 11, the base station allocates control information on each component carrier to a control region of a corresponding component carrier in accordance with a current DCI format. Also, the user equipment should acquire scheduling information on each component carrier, i.e., DCI received through PDCCH by performing blind decoding for each component carrier. Accordingly, decoding complexity for acquiring DCI on all the component carriers may be increased in proportion to the number of component carriers.

For example, it is assumed that a total number of blind decoding times of the user equipment is N times, the size of the user equipment specific search space is Mu and the size of the common search space is Mc. Also, if blind decoding at the user equipment specific search space is performed Nu times and blind decoding at the common search space is performed Nc times, a total number of blind decoding times per component carrier will be Mu*Nu+Mc*Nc times. At this time, if the number of component carriers is C and a carrier aggregation scheme is used, a total number of blind decoding times will be C*(Mu*Nu+Mc*Nc) times as far as there is no specific method for reducing blind decoding complexity. Accordingly, if C*(Mu*Nu+Mc*Nc) is greater than the total number of blind decoding times N of the user equipment, it means that the user equipment may end blind decoding without searching for the PDCCH transmitted from the base station.

Figure 12:
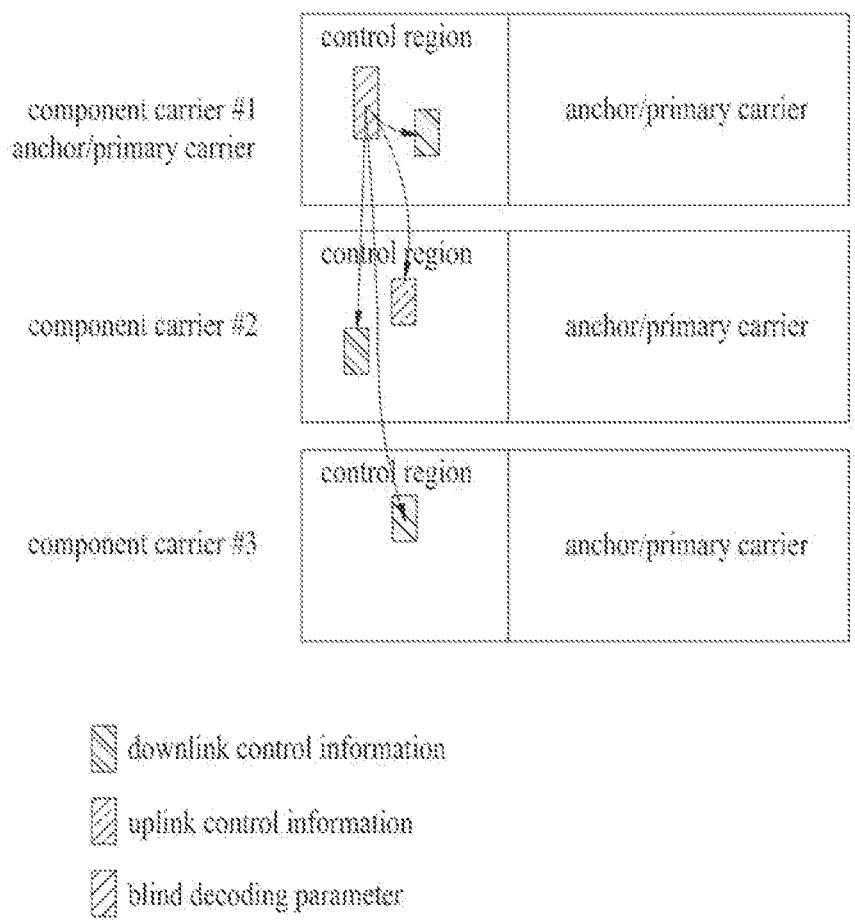
FIG. 12 is a diagram illustrating another example of transmission of control information through a plurality of component carriers in an LTE-A system.

FIG. 12 is a diagram illustrating another example of transmission of control information through a plurality of component carriers in an LTE-A system.

Referring to FIG. 12, a blind decoding parameter of another component carrier is transmitted from a specific component carrier, i.e., anchor carrier or primary carrier, whereby blind decoding complexity may be reduced. However, in this case, if decoding of the specific component carrier is failed, a problem occurs in view of reliability in that decoding of the other component carriers may be failed.

Hereinafter, in the LTE-A system to which a carrier aggregation scheme is applied, if the base station allocates control information on each component carrier to the control region of the corresponding component carrier, methods for reducing blind decoding complexity performed by the user equipment to acquire PDCCH allocated to the user equipment are suggested as follows.

1) Reduction of the Number of Component Carriers to be Searched

If the user equipment reduces the number of component carriers to be searched, so as to acquire control information, it means that one or more of all the component carriers allocated to the user equipment include control information of the other component carriers. Accordingly, the number of blind decoding times and the size of the search space corresponding to the number of blind decoding times may be defined per component carrier, whereby a total number of blind decoding times may be N times. In this case, it is noted that control information on the other component carriers does not mean a decoding parameter of the other component carriers.

In the mean time, the user equipment may be set to search for the PDCCH at the same search space per component carrier, whereby a total number of blind decoding times may be less than N times.

However, information as to which component carrier includes scheduling information, i.e., information as to reduction of the number of component carriers to be searched should previously be shared between the base station and the user equipment, and this signaling may be performed through an upper layer.

2) Size of Search Space

The size of the search space for one component carrier may be increased or reduced. In other words, if blind decoding performance of the user equipment is not sufficient to perform decoding for all the component carriers allocated to the user equipment, the size of the search space may be reduced. Also, if blind decoding performance of the user equipment is sufficient to perform decoding for all the component carriers allocated to the user equipment, the size of the search space may be increased.

First of all, if the size of the search space is reduced, a new search space different from the search space of the LTE system according to the related art may be defined and the number of search spaces may be restricted in accordance with a CCE aggregation level. In other words, if the new search space is defined, a specific CCE aggregation level applied to the new search space or a group of CCE aggregation levels may be defined. For example, if one CCE aggregation level is used and ten user equipment specific search spaces per component carrier are defined, the search spaces may be defined as ten continuous logical search spaces starting from the user equipment specific search space dependent upon subframe index. Also, if two CCE aggregation levels are defined, ten user equipment specific search spaces per component carrier may equally be divided into two groups. In this case, each CCE aggregation level may correspond to five search spaces having the same start point as that of the existing user equipment specific search space. In the mean time, if a search space structure applied to the existing LTE system is maintained, reduction in the size of the search space may be implemented simply by reduction of the number of search spaces per CCE aggregation level. For example, the search space corresponding to the smallest CCE aggregation level or the greatest CCE aggregation level may be removed to reduce the size of the search space.

On the other hand, if the size of the search space is increased, the number of search spaces according to the existing LTE system may be added to correspond to the smallest CCE aggregation level or the greatest CCE aggregation level, or the search spaces corresponding to the respective CCE aggregation levels may be added as much as the respective CCE aggregation levels. Also, the search spaces corresponding to the respective CCE aggregation levels may be added in proportion to the size of the existing search space.

As described above, even in the case that the new search space is defined, information on the added search space should be shared in advance between the base station and the user equipment, and this signaling may be performed through an upper layer.

3) The Number of Decoding Times Per Search Space

Under the assumption that there is no big change in a transmission mode as actual transmission is performed, the number of blind decoding times per search space may be restricted. In more detail, a downlink PDCCH indication structure may be the same as an uplink PDCCH indication structure regardless of the transmission mode. In this case, although a DCI format of a downlink grant may be different from that of an uplink grant, bits for channel coding may be set equally regardless of a downlink or an uplink. In other words, padding bits may be added to a downlink DCI format of a short length or a DCI format of an uplink grant to constitute one codeword length. Accordingly, since the user equipment can detect two uplink and downlink DCI formats by decoding one codeword, the number of blind decoding times may be reduced to half.

It will be apparent to the person with ordinary skill in the art to which the present invention pertains that the aforementioned three parameters may be used independently or in combination.

In the mean time, the aforementioned three parameters may be used differently in accordance with uplink scheduling and downlink scheduling. Since scheduling information on a downlink component carrier may generally be more than that on a downlink component carrier, scheduling for an uplink component carrier may be indicated differently from scheduling for a downlink component carrier.

For example, it is assumed that downlink scheduling information corresponds to five downlink component carriers and uplink scheduling information corresponds to two uplink component carriers. In this case, if one PDCCH includes only scheduling information on one component carrier, a total number of uplink PDCCHs will be two. If the number of uplink PDCCHs is restricted as above, the other component carriers may be used to decode downlink scheduling information only. Also, if a primary component carrier for scheduling exists, a primary component carrier for uplink scheduling and a primary component carrier for downlink scheduling may be set separately.

As described above, if a primary component carrier for uplink scheduling and a primary component carrier for downlink scheduling exist separately, the base station may previously notify the user equipment of DCI grant information on a component carrier to be searched from a control region of the primary component carrier for downlink scheduling. In other words, the user equipment may previously identify scheduling information on component carrier(s) to be searched, from a specific downlink component carrier. This information may be indicated from the base station to the user equipment through upper layer signaling.

Figure 13:
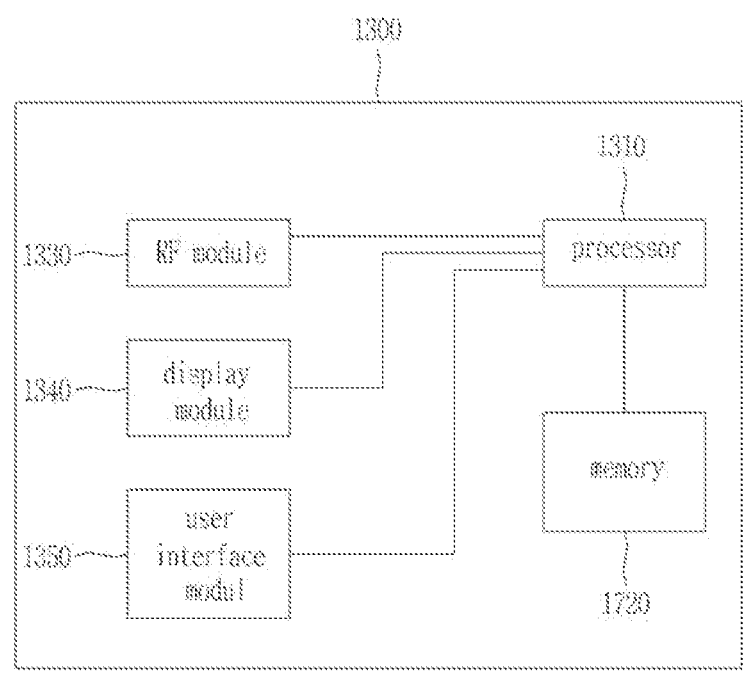
FIG. 13 is a diagram illustrating a transmitter and a receiver, which can be applied to one embodiment of the present invention.

FIG. 13 is a diagram illustrating a communication transceiver according to the embodiment of the present invention. The transceiver may be a part of the base station and the user equipment.

Referring to FIG. 13, the transceiver 1300 includes a processor 1310, a memory 1320, a radio frequency (RF) module 1330, a display module 1340, and a user interface module 1350. The transceiver 1300 is illustrated for convenience of description, and some of its modules may be omitted. Also, the transceiver 1300 may further include necessary modules. Moreover, some modules of the transceiver 1300 may be divided into segmented modules. The processor 1310 is configured to perform the operation according to the embodiment of the present invention illustrated with reference to the drawings. If the transceiver 1300 is a part of the base station, the processor 1310 may generate a control signal and map the control signal into a control channel configured within a plurality of component carriers. In more detail, the processor 1310 of the transceiver 1300 which is a part of the base station may map control information through one or more of a plurality of component carriers to reduce blind decoding complexity of the user equipment. In this case, the number of blind decoding times and the size of the search space corresponding to the number of blind decoding times may be defined per component carrier, whereby the total number of blind decoding times may be N times. In this case, it is noted that control information on the other component carriers does not mean a decoding parameter of the other component carriers. The processor 1310 of the transceiver 1300 which is a part of the base station may constitute one codeword length by adding padding bits to a DCI format of a downlink grant and a DCI format of an uplink grant. Accordingly, since the user equipment can detect two uplink and downlink DCI formats by decoding one codeword, the number of blind decoding times may be reduced.

Also, if the transceiver 1300 is a part of the user equipment, the processor 1310 may identify the control channel indicated by a signal received from the plurality of component carriers and extract the control signal from the control channel. Afterwards,h the processor 1310 may perform the operation required based on the control signal. In more detail, the processor 1310 of the transceiver 1300 which is a part of the user equipment searches for PDCCH at the same search space per component carrier to perform blind decoding, whereby a total number of blind decoding times may be less than N times. Also, if blind performance of the user equipment is not sufficient to perform blind decoding for all the component carriers allocated to the user equipment, the processor 1310 may reduce the size of the search space. By contrast, if blind performance of the user equipment is sufficient to perform blind decoding for all the component carriers allocated to the user equipment, the processor 1310 may increase the size of the search space. Also, if the processor 1310 of the transceiver 1300 which is a part of the user equipment may constitute one codeword length by adding padding bits to a DCI format of a downlink grant and a DCI format of an uplink grant, since the user equipment can detect two uplink and downlink DCI formats by decoding one codeword, the number of blind decoding times may be reduced to half.

The memory 1320 is connected with the processor 1310 and stores an operating system, an application, a program code, and data therein. The RF module 1330 is connected with the processor 1310 and converts a baseband signal to a radio signal or vice versa. To this end, the RF module 1330 performs analog conversion, amplification, filtering and frequency uplink conversion, or their reverse processes. The display module 1340 is connected with the processor 1310 and displays various kinds of information. Examples of the display module 1340 include, but not limited to, a liquid crystal display (LCD), a light emitting diode (LED), and an organic light emitting diode (OLED). The user interface module 1350 is connected with the processor 1310, and can be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be applied to a wireless communication system. More specifically, the present invention may be applied to a method for receiving control information in a user equipment of a wireless communication system to which carrier aggregation is applied.

The invention claimed is:

1. A method for receiving control information in a wireless communication system to which a carrier aggregation scheme is applied, the method comprising:
   receiving, by a user equipment from a base station, a control region through one or more of a plurality of component carriers; and
   performing, by the user equipment, blind decoding for the control region to acquire the control information allocated to the user equipment,
   wherein the control region includes
      control information on the one or more component carriers or control information on the other component carriers, and
      an uplink grant and a downlink grant, the uplink grant and the downlink grant, having identical bit lengths for channel coding.

2. The method according to claim 1, further comprising:
   receiving information on the one or more component carriers from the base station before receiving the control region.

3. The method according to claim 1, wherein the receiving control information includes performing blind decoding for the same search space corresponding to each of the one or more component carriers.

4. The method according to claim 1, wherein the control information is subjected to channel coding of one codeword basis.

5. The method according to claim 1, wherein the one or more component carriers are divided into component carriers for downlink control information and component carriers for uplink control information.

6. A user equipment in a wireless communication system to which a carrier aggregation scheme is applied, the user equipment comprising:
   a receiving module receiving a control region from a base station through one or more of a plurality of component carriers; and
   a processor performing blind decoding for the control region to acquire the control information allocated to the user equipment,
   wherein the control region includes
      control information on the one or more component carriers or control information on the other component carriers, and
      an uplink grant and a downlink grant, the uplink grant and the downlink grant, having identical bit lengths for channel coding.

7. The user equipment according to claim 6, wherein the receiving module receives information on the one or more component carriers from the base station.

8. The user equipment according to claim 6, wherein the processor performs blind decoding for the same search space corresponding to each of the one or more component carriers.

9. The user equipment according to claim 6, wherein the control information is subjected to channel coding of one codeword basis.

10. The user equipment according to claim 6, wherein the one or more component carriers are divided into component carriers for downlink control information and component carriers for uplink control information.

* * * * *